United States Patent [19]

Kawamura

[11] 4,201,239
[45] May 6, 1980

[54] SEALING DEVICE FOR A VALVE

[75] Inventor: Masao Kawamura, Tokyo, Japan

[73] Assignee: Kitamura Valve Seizo Kabushiki Kaisha, Tokyo, Japan

[21] Appl. No.: 879,265

[22] Filed: Feb. 21, 1978

[30] Foreign Application Priority Data

Mar. 30, 1977 [JP] Japan .................................. 52/37721

[51] Int. Cl.² .............................................. F16K 5/06
[52] U.S. Cl. ...................... 137/72; 251/173; 251/174
[58] Field of Search ............... 251/173, 174, 306, 307; 137/72, 73, 74

[56] References Cited

U.S. PATENT DOCUMENTS

| | | | |
|---|---|---|---|
| 3,177,887 | 4/1965 | Priese | 137/74 |
| 3,480,253 | 11/1969 | Priese et al. | 251/174 |
| 3,593,960 | 7/1971 | Scaramucci | 251/306 |
| 3,598,363 | 8/1971 | Shaw | 251/172 |
| 3,650,508 | 3/1972 | Kosmala et al. | 251/174 |
| 4,005,848 | 2/1975 | Eggleston | 251/173 |
| 4,105,040 | 8/1978 | Chester | 137/72 |

FOREIGN PATENT DOCUMENTS 45-32861 10/1970 Japan ........................................ 251/306

Primary Examiner—Martin P. Schwadron
Assistant Examiner—Richard Gerard
Attorney, Agent, or Firm—Bard & Groves

[57] ABSTRACT

A sealing device is provided for use in a butterfly valve, ball valve or the like wherein a seal ring is provided which forms a seal in co-operation with a rotating valve member, in which the seal is held in position by an annular pressure member which is impelled towards the body of the valve by springs, and whose inner periphery is adapted to form an emergency seal in co-operation with the valve member, should the seal itself be damaged or destroyed by fire.

11 Claims, 3 Drawing Figures

SEALING DEVICE FOR A VALVE

The present invention relates to a sealing device for sealing a butterfly valve, a ball valve, or the like. The valve member may have any form of which the outside surface is part of a surface of revolution generated by rotating a curve about an axis of rotation, and in a preferred embodiment is a portion of a sphere.

A conventional valve has the defects that when a valve seal is slightly worn or damaged the function of the valve is impaired, and if the valve seal is melted by heat in a fire or an accident, fluid is able to leak through the valve, possibly causing a further accident.

It is an object of the present invention to provide a sealing device free from the above-mentioned defects and having extra safety and security.

This object is accomplished according to the present invention by, in a valve which comprises a valve body formed with a cavity and an annular recess which extends around the periphery of the cavity and which has a side recess face and a bottom recess face which joins to the wall of the cavity, and a valve member which is mounted within the cavity so as to rotate about an axis of rotation substantially perpendicular to the central longitudinal axis of the cavity, and whose surface is part of a surface of revolution generated by rotating a curve about said axis of rotation, a seal device comprising an annular retainer attached to the valve body in a manner to oppose the annular recess therein, a flexible annular seal partly located in the recess, and having an inner peripheral surface adapted to co-operate with the outer surface of the valve member to form a seal therebetween and an outer peripheral surface in contact with the side recess face of the recess, an annular pressure member located between the retainer and the valve body and which has an inner peripheral surface adapted to co-operate with the outer surface of the valve member and a surface facing the valve body adapted to co-operate with the surface of the valve body, should the annular seal be destroyed, and a spring means which is located between the retainer and the pressure member and which urges the pressure member towards the valve body.

In order that the invention may be better understood, one embodiment will now be described with reference to the accompanying drawings which are given by way of illustration only, and thus are not limitative of the present invention, and wherein.

Figure 1:
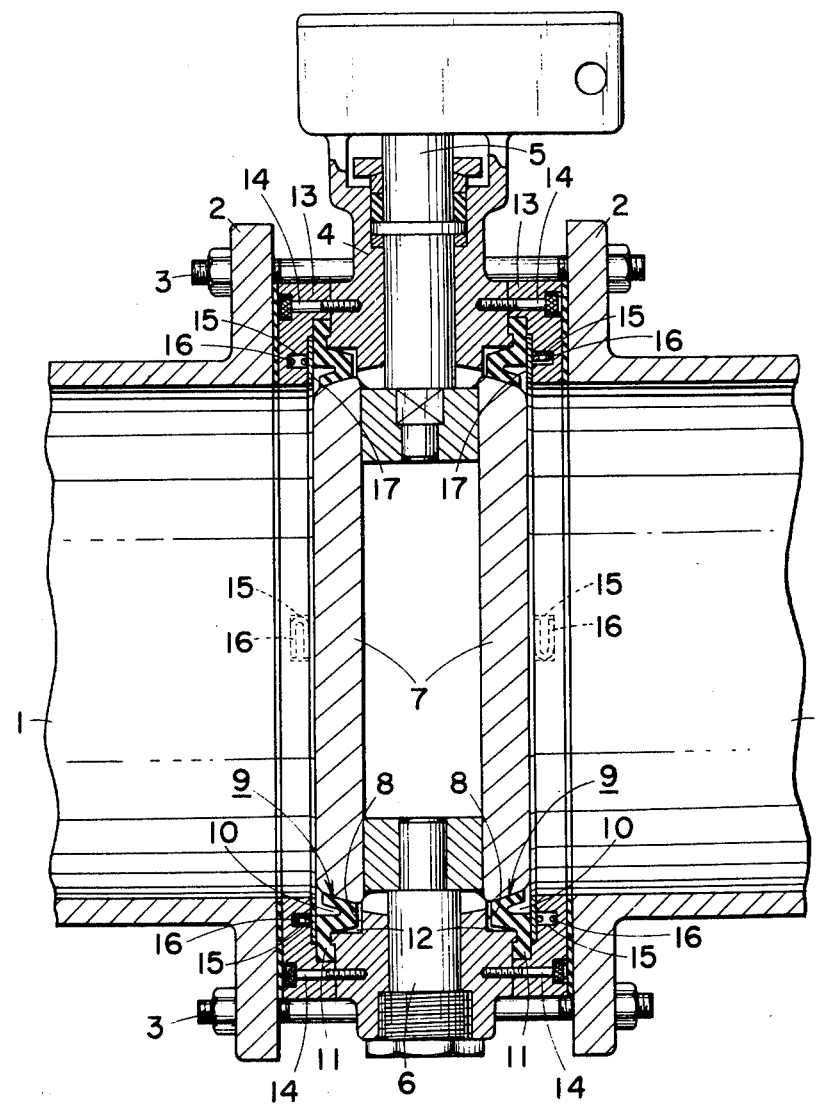
FIG. 1 is a longitudinal section of a butterfly valve incorporating a sealing device according to the present invention.
Figure 2:
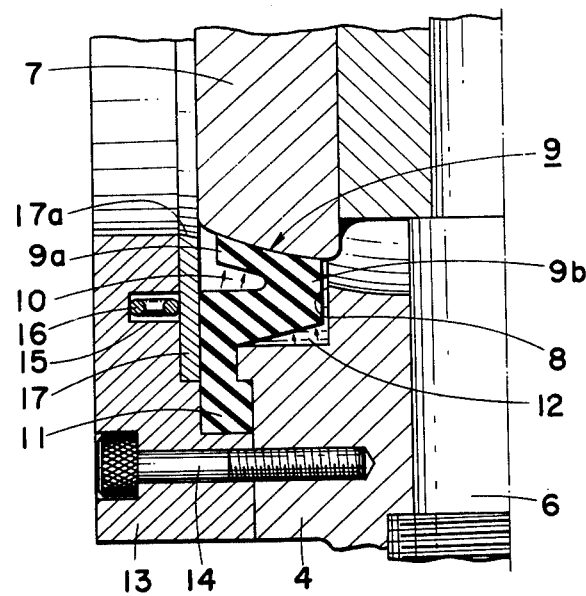
FIG. 2 is an enlarged fragmentary cross-section of the sealing device of FIG. 1.

Referring to FIGS. 1 and 2 of the drawings, there is shown a butterfly valve in which is incorporated a sealing device according to the present invention, which is disposed between a pair of flanges 2 of a pair of left and right pipes 1 by coupling members 3, each comprising a threaded stud and two nuts.

A pair of disc-shaped valve members 7 are attached to upper and lower valve stems 5 and 6 which are rotatably mounted within an annular valve body 4 in such a way that the disc-shaped valve members 7 may be rotated through 90° about the axis of the valve stems 5 and 6 so as to close and open the valve to the passage of fluid through the pipes 1.

Each valve member 7 has a substantially spherical outer surface around its periphery, which coaxially contacts with a substantially spherical inner surface of each of right and left annular seals 9. Each seal 9 is made of a plastic material or the like, having slight flexibility, and includes an annular groove 10 in its outward facing surface and a radially outwardly directed flange portion around its periphery.

The two seals 9 are disposed between the right and left outer ends of the cavity in the annular body 4, in part occupying annular recesses 8 formed in the inner surfaces thereof, and a pair of annular retainers 13, each of which is coaxially mounted to the valve body 4 by bolts 14, so that the inner surface of the seal 9 may be held in contact under pressure with the outer surface of the valve member 7, and a small gap 12 may be formed between the side face of the annular recess 8 and the seal 9.

Spaced around the inner side of each retainer 13, facing the corresponding seal 9, are provided a plurality of recesses 15 which hold compression springs 16 which press inwards a non-flammable annular pressure member 17, which, like the seal 9, has a substantially spherical inner surface corresponding in shape to the outer surface of the valve member 7 and which is coaxially disposed between the seal 9 and the retainer 13.

In FIG. 2 a fragmentary cross-section of part of the valve is shown, with the valve in the closed position, and giving an enlarged view of one of the sealing devices. When the valve member 7 is subjected to fluid pressure from the left hand side, the pressure contact part 9a of the left inner side of the seal 9 is firmly held in contact with the substantially spherical outer surface of the valve member 7 by the pressure of fluid in the annular groove 10. On the other hand, when the valve member 7 is subjected to fluid pressure from the right hand side, the pressure contact part 9b of the right inner side of the seal 9 is firmly held in contact with the substantially spherical outer surface of the valve member by the pressure of fluid in the cavity 12.

When the seal 9 is slightly worn or damaged, according to the present invention the compression springs 16 push the annular pressure member 17 to the right in the figure, and thus by maintaining the seal 9 in compression hold it firmly in contact with the outer surface of the valve member 7. Hence the function of the valve is not impaired.

Figure 3:
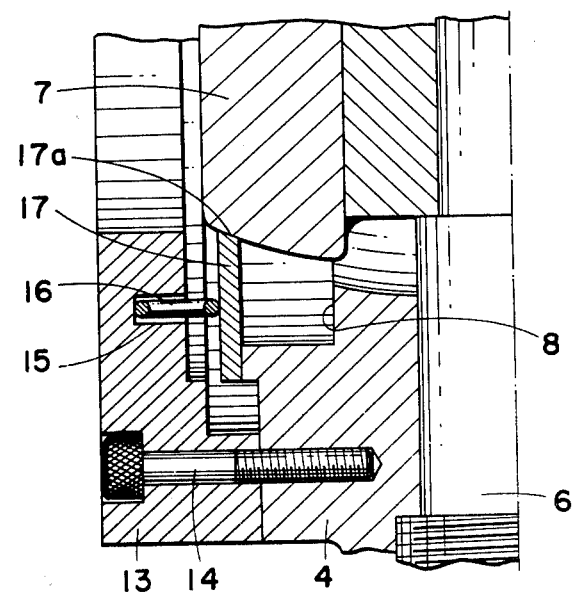
FIG. 3 is an enlarged fragmentary cross-section of the sealing device of FIG. 1, when the seal has been melted away.

Furthermore, if the seal 9 is melted by heat in a fire or an accident, as shown in FIG. 3, the annular pressure member 17 is pushed inwards to the right in the figure by the compression springs 16, with the result that the substantially spherical inner surface 17a of the annular pressure member 17 is held in contact with the outer surface of the valve member 7 and the inner side of the annular pressure member 17 is simultaneously held in contact with the side of the valve body 4. Consequently, an effective temporary seal is made in the valve and the possibility of a further serious accident due to substantial leakage of the fluid is eliminated, thus making the valve safer and more secure than a conventional design.

Although the invention has been described with respect to a particular embodiment thereof, it should be understood by those skilled in the art that various changes and omissions may be made in the form and detail thereof without departing from the scope of the invention. For instance, the groove 10 and/or the cavity 12, although beneficial to the operation of the valve, are not essential. Nor need the outer surface of the valve member be part of a sphere, but it can be any solid of revolution about the axis of rotation of the valve member. Further the provision of two seal members, although advisable, is not essential.

What is claimed is:

1. In a valve which comprises:
   a valve body formed with a cavity and an annular recess which extends around the periphery of the cavity and which has a side recess face and a bottom recess face which joins the wall of the cavity;
   and a valve member which is mounted within the cavity so as to rotate about an axis of rotation substantially perpendicular to the central longitudinal axis of the cavity, and whose surface is part of a surface of revolution generated by rotating a curve about said axis of rotation;
   a seal device comprising:
   a retainer attached to the valve body in a manner to oppose the annular recess therein;
   a flexible annular seal of substantially uniform composition partly located in the recess, and having an inner peripheral surface adapted to co-operate with the outer surface of the valve member to form a seal therebetween, and an outer peripheral surface in contact with the side recess face of the recess;
   an annular pressure member located between the retainer and the valve body and which has an inner peripheral surface adapted to co-operate with the outer surface of the valve member and a surface facing the valve body adapted to co-operate with the part of the surface of the valve body which it confronts, should the annular seal be destroyed, said annular seal lying partly between said pressure member and said valve body;
   and a spring means which is located between the retainer and the pressure member and which urges the pressure member towards the valve body;
   said urging being resisted solely by the interposition of said annular seal between said pressure member and said valve body, with the configuration of said seal and pressure member being such that said urging has no effect on the sealing contact between the inner peripheral surface and valve member.

2. The seal device of claim 1, wherein the surface of the valve member is part of the surface of a sphere.

3. The seal device of claim 2, where a groove is formed on the face of the seal which confronts said pressure member adjacent to its boundary with the inner peripheral surface of the seal.

4. The seal device of claim 2, where a cavity is present between part of the outer peripheral surface of the seal and the side recess face of the recess.

5. The seal device of claim 4, where a groove is formed on the face of the seal which confronts said pressure member adjacent to its boundary with the inner peripheral surface of the seal.

6. A seal device as in claim 1, wherein the seal is formed of flammable material.

7. A valve comprising:
   a valve body which is formed with a cavity and two annular recesses, one around the periphery of each of the ends of the cavity, each recess having a side recess face and a bottom recess face which joins to the wall of the cavity,
   a valve member which is mounted within the cavity so as to rotate about an axis of rotation substantially perpendicular to the central axis of the cavity, and whose surface is part of a surface of revolution generated by rotating a curve about said axis of rotation,
   and at least two seal devices, each associated with one of the annular recesses, and each comprising:
   an annular retainer attached to the valve body in a manner to oppose the annular recess therein;
   a flexible annular seal of substantially uniform composition partly located in the recess, and having an inner peripheral surface adapted to co-operate with the outer surface of the valve member to form a seal therebetween, and an outer peripheral surface in contact with the side recess face of the recess;
   an annular pressure member located between the retainer and the valve body and which has an inner peripheral surface adapted to co-operate with the outer surface of the valve member and a surface facing the valve body adapted to co-operate with the part of the surface of the valve body which it confronts, should the annular seal be destroyed, said annular seal lying partly between said pressure member and said valve body;
   and a spring means which is located between the retainer and the pressure member and which urges the pressure member towards the valve body;
   said urging being resisted solely by the interposition of said annular seal between said pressure member and said valve body, with the configuration of said seal and pressure member being such that said urging has no effect on the sealing contact between the inner peripheral surface and valve member.

8. A valve as in claim 7, wherein the surface of the valve member is part of the surface of a sphere.

9. A valve as in claim 8, wherein each seal device is formed with a groove on its face which confronts its pressure member adjacent to its boundary with the inner peripheral surface of the seal.

10. A valve as in claim 9, wherein a cavity is present between part of the outer peripheral surface of each seal and the side recess face of the recess which corresponds to that seal.

11. A valve as in claim 7, wherein the seals are formed of flammable material.